United States Patent
Coppola et al.

(10) Patent No.: US 12,554,404 B2
(45) Date of Patent: Feb. 17, 2026

(54) MNAND FIELD TO PREDICT DEVICE PERFORMANCE

(71) Applicant: Micron Technology, Inc., Boise, ID (US)

(72) Inventors: Gianluca Coppola, Liveri (IT); Daniela Ruggeri, Torre del Greco (IT); Nicola Colella, Capodrise (IT); Fabrizio Fiorenza, Giugliano in Campania (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/590,721

(22) Filed: Feb. 28, 2024

(65) Prior Publication Data
US 2024/0295965 A1  Sep. 5, 2024

Related U.S. Application Data

(60) Provisional application No. 63/449,492, filed on Mar. 2, 2023.

(51) Int. Cl.
 *G06F 3/06* (2006.01)

(52) U.S. Cl.
 CPC .......... *G06F 3/0613* (2013.01); *G06F 3/0634* (2013.01); *G06F 3/0679* (2013.01)

(58) Field of Classification Search
 CPC .......... G06F 12/00; G06F 3/06; G06F 3/0634; G06F 3/0613; G06F 3/0659; G06F 3/0679; G06F 3/0661
 See application file for complete search history.

(56) References Cited

U.S. PATENT DOCUMENTS

| | | | |
|---|---|---|---|
| 10,521,118 B2 * | 12/2019 | Benisty | G06F 3/0688 |
| 12,253,940 B2 * | 3/2025 | Jain | G06F 12/0246 |
| 2014/0281127 A1 * | 9/2014 | Marcu | G06F 12/0238 |
| | | | 711/103 |

(Continued)

FOREIGN PATENT DOCUMENTS

| | | | | |
|---|---|---|---|---|
| WO | WO-2014039716 A1 * | 3/2014 | | G11C 7/1015 |
| WO | WO-2015160496 A1 * | 10/2015 | | G06F 12/0246 |

(Continued)

OTHER PUBLICATIONS

D. A. Roberts, H. Ye, T. Brewer and S. Eilert, "In-Memory Versioning (IMV)," in IEEE Computer Architecture Letters, vol. 22, No. 1, pp. 65-68, Jan.-Jun. 2023.*

(Continued)

*Primary Examiner* — Pierre Michel Bataille
(74) *Attorney, Agent, or Firm* — Schwegman Lundberg & Woessner, P.A.

(57) ABSTRACT

A memory device includes a memory array and a memory control unit. The memory array includes memory cells. The memory control unit is configured to calculate an amount of data that can be written by a host device to the memory device in a burst performance mode before changing to sustained performance mode; calculate an amount of data that can be written to the memory device in the sustained performance mode before changing to writing the memory according to a dirty performance mode; and provide results of the calculations to the host device.

18 Claims, 6 Drawing Sheets

(56) References Cited

U.S. PATENT DOCUMENTS

| | | | |
|---|---|---|---|
| 2015/0268860 A1* | 9/2015 | Yum | G06F 3/061 |
| | | | 711/154 |
| 2015/0324119 A1* | 11/2015 | Romanovsky | G06F 3/061 |
| | | | 711/103 |
| 2017/0068451 A1* | 3/2017 | Kenan | G06F 3/0659 |
| 2017/0371588 A1* | 12/2017 | Shaharabany | G06F 3/0688 |
| 2020/0073795 A1* | 3/2020 | Asano | G06F 3/0656 |
| 2021/0132815 A1* | 5/2021 | Jang | G06F 3/0608 |
| 2021/0191858 A1* | 6/2021 | Li | G06F 12/0253 |
| 2021/0389876 A1* | 12/2021 | Muthiah | G06F 3/0608 |
| 2022/0004491 A1* | 1/2022 | Muchherla | G06F 12/0253 |
| 2022/0057956 A1* | 2/2022 | Liang | G06F 3/0604 |
| 2023/0281122 A1* | 9/2023 | Jain | G06F 12/0246 |
| | | | 711/154 |

FOREIGN PATENT DOCUMENTS

| | | | | |
|---|---|---|---|---|
| WO | WO-2017222607 A1 * | 12/2017 | | G06F 13/1673 |
| WO | WO-2018052690 A1 * | 3/2018 | | G06F 11/34 |
| WO | WO-2022039939 A1 * | 2/2022 | | G06F 3/0653 |

OTHER PUBLICATIONS

J. Lee, Y. Kim, G. M. Shipman, S. Oral and J. Kim, "Preemptible I/O Scheduling of Garbage Collection for Solid State Drives," in IEEE Transactions on Computer-Aided Design of Integrated Circuits and Systems, vol. 32, No. 2, pp. 247-260, Feb. 2013.*

L. -P. Chang, "A Hybrid Approach to NAND-Flash-Based Solid-State Disks," in IEEE Transactions on Computers, vol. 59, No. 10, pp. 1337-1349, Oct. 2010.*

* cited by examiner

MNAND FIELD TO PREDICT DEVICE PERFORMANCE

PRIORITY APPLICATION

This application claims the benefit of priority to U.S. Provisional Application Ser. No. 63/449,492, filed Mar. 2, 2023, which is incorporated herein by reference in its entirety.

Embodiments of the disclosure relate to managed memory devices, and more specifically relate to a memory device that can calculate the amount of data space available for write operations, and provide the amount calculated to a host device.

BACKGROUND

Memory devices are typically provided as internal, semiconductor, integrated circuits in computers or other electronic devices. There are many different types of memory including volatile and non-volatile memory. Volatile memory can require power to maintain data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

Memory cells are typically arranged in a matrix or an array. Multiple matrices or arrays can be combined into a memory device, and multiple devices can be combined to form a storage volume of a memory system, such as a solid-state drive (SSD), a Universal Flash Storage (UFS™) device, a MultiMediaCard (MMC) solid-state storage device, an embedded MMC device (eMMC™), etc., as discussed further below.

The amount of memory space available to a write operation that includes a large amount of data can impact the system throughput between host devices and a memory device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Memory devices can include arrays of memory cells. Managed memory devices can include a memory control unit to control or manage access to the memory arrays according to multiple memory management protocols. These protocols may be implemented in firmware installed in the memory control unit and can be performed using processing circuitry. The protocols can implement different performance modes of the memory system. A conventional approach is to design a memory system to change modes according to operating conditions of the memory system. A better approach is to monitor the memory system to anticipate slowdowns and proactively avoid them.

Memory devices include individual memory die, which may, for example, include including a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, as a "host" device as discussed later herein. In such managed memory devices, the controller functionality may be implemented on one or more die also incorporating a memory array, or on a separate die. In other examples, one or more memory devices may be combined with controller functionality to form a solid-stage drive (SSD) storage volume.

Embodiments of the present disclosure are described in the example of managed memory devices implementing NAND flash memory cells. These examples can be referred to as managed NAND or mNAND devices. These examples, however, are not limiting on the scope of the disclosure, which may be implemented in other forms of memory devices and/or with other forms of storage technology.

Both NOR and NAND flash architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a Universal Flash Storage (UFS™) device, or an embedded MMC device (eMMC™), etc. For example, in the case of the above examples, UFS devices may be configured in accordance with Joint Electron Device Engineering Council (JEDEC) standards (e.g., JEDEC standard JESD223D, entitled JEDEC UFS Flash Storage 3.0, etc., and/or updates or subsequent versions to such standard. Similarly, identified eMMC devices may be configured in accordance with JEDEC standard JESD84-A51, entitled "JEDEC eMMC standard 5.1", again, and/or updates or subsequent versions to such standard.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact. Managed memory devices, for example managed NAND devices, can be used as primary or ancillary memory in various forms of electronic devices, and are commonly used in mobile devices.

Managed memory devices can include a number of memory devices, including a number of dies or logical units (e.g., logical unit numbers or LUNs), and can include one or more processors or other controllers performing logic functions required to operate the memory devices or interface with external systems. Such managed memory devices can include one or more flash memory die, including a number of memory arrays and peripheral circuitry thereon. The flash memory arrays can include a number of blocks of memory cells organized into a number of physical pages. Managed NAND devices can include one or more arrays of volatile and/or nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.) between the memory devices and the host, or erase operations to erase data from the memory devices.

Figure 1:
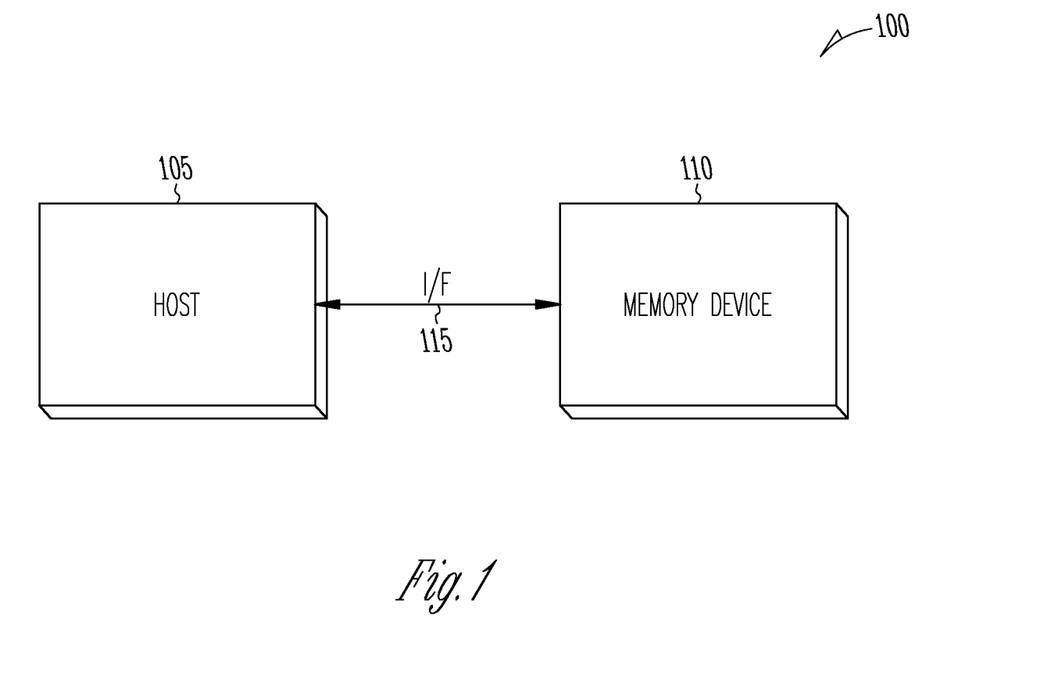
FIG. 1 illustrates an example system including a host and a memory device according to some examples described herein.

FIG. 1 illustrates an example system 100 including a host 105 and a memory device 110. The host 105 can include a host processor, a central processing unit, or one or more other device, processor, or controller. The memory device 110 can include one or more other memory devices, or the communication interface 115 can include one or more other interfaces, depending on the host 105 and the memory device 110.

Each of the host 105 and the memory device 110 can include a number of receiver or driver circuits configured to send or receive signals over the communication interface 115, or interface circuits, such as data control units, sampling circuits, or other *intermedia* circuits configured to process data to be communicated over, or otherwise process data received from the communication interface 115 for use by the host 105, the memory device 110, or one or more other circuits or devices.

The memory device 110 can include a memory array (e.g., one or more arrays of memory cells, such as a NAND flash memory array, or one or more other memory arrays), a memory control unit, and in certain examples, an interface circuit between the memory array and the memory control unit. In certain examples, the memory device can include a number of memory die, each having control logic separate from the memory control unit. The memory control unit can include an application specific integrated circuit (ASIC), a field programmable gate array (FPGA), or one or more other processing circuits arranged or programmed to manage data transfers or operations to, from, or within the memory array.

Figure 2:
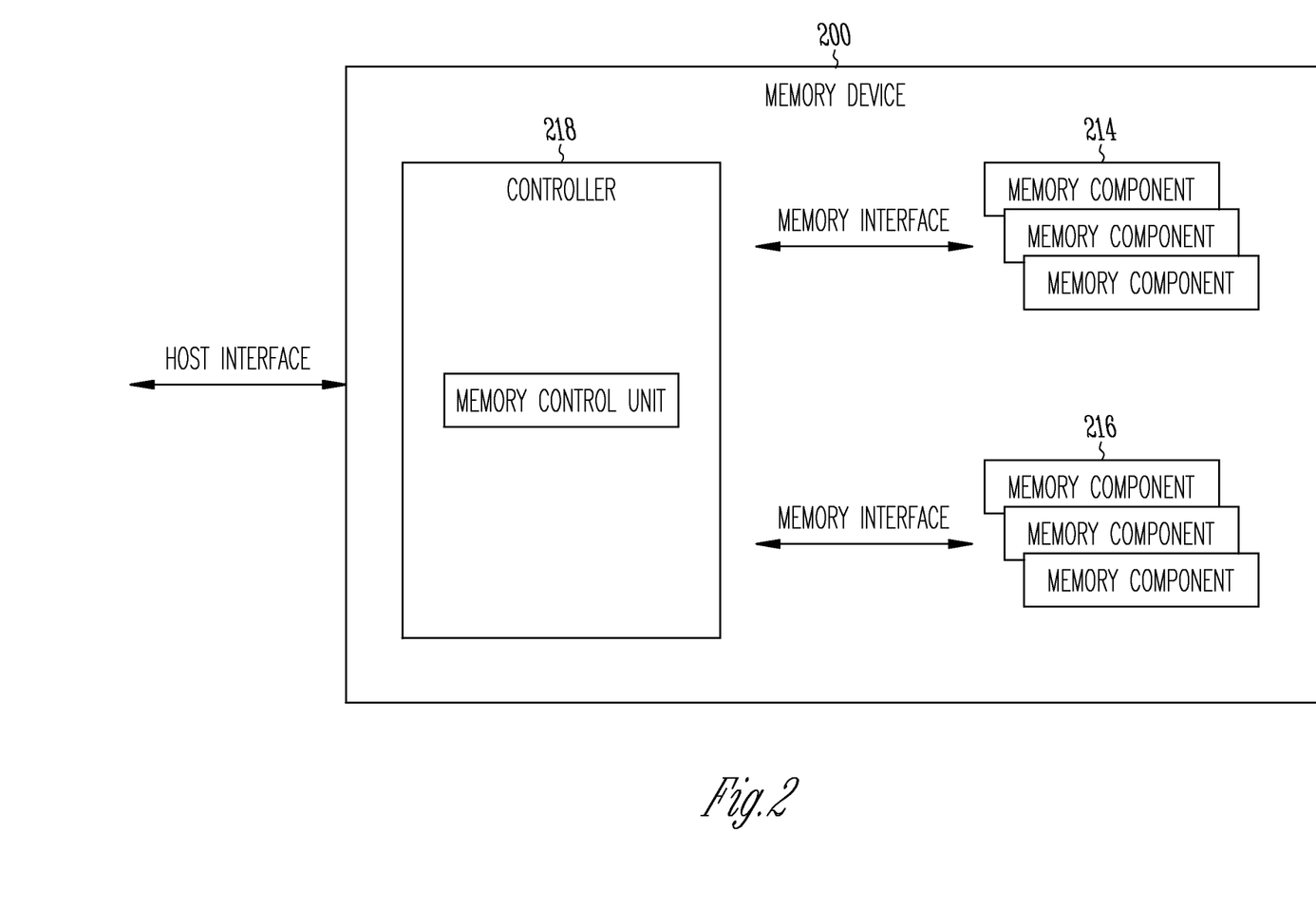
FIG. 2 is a block diagram of an apparatus in the form of a memory device according to some examples described herein.

FIG. 2 shows a block diagram of an example memory device 200 suitable for use as memory device 110 in FIG. 1. The memory device 200 can be a managed NAND memory device in which a memory control unit 218 is packaged together with memory components 214, 216. In some examples, the memory components 214, 216 include one or more NAND die. The memory control unit 218 can include processing circuitry components such as processor, a state machine (e.g., finite state machine), register circuits, and other components. The memory control unit 218 controls memory management functions such as media management and lower level memory management operations such as read, write, and erase operations, program-verify operations, calibrations, etc. of the memory device 200.

Figure 3:
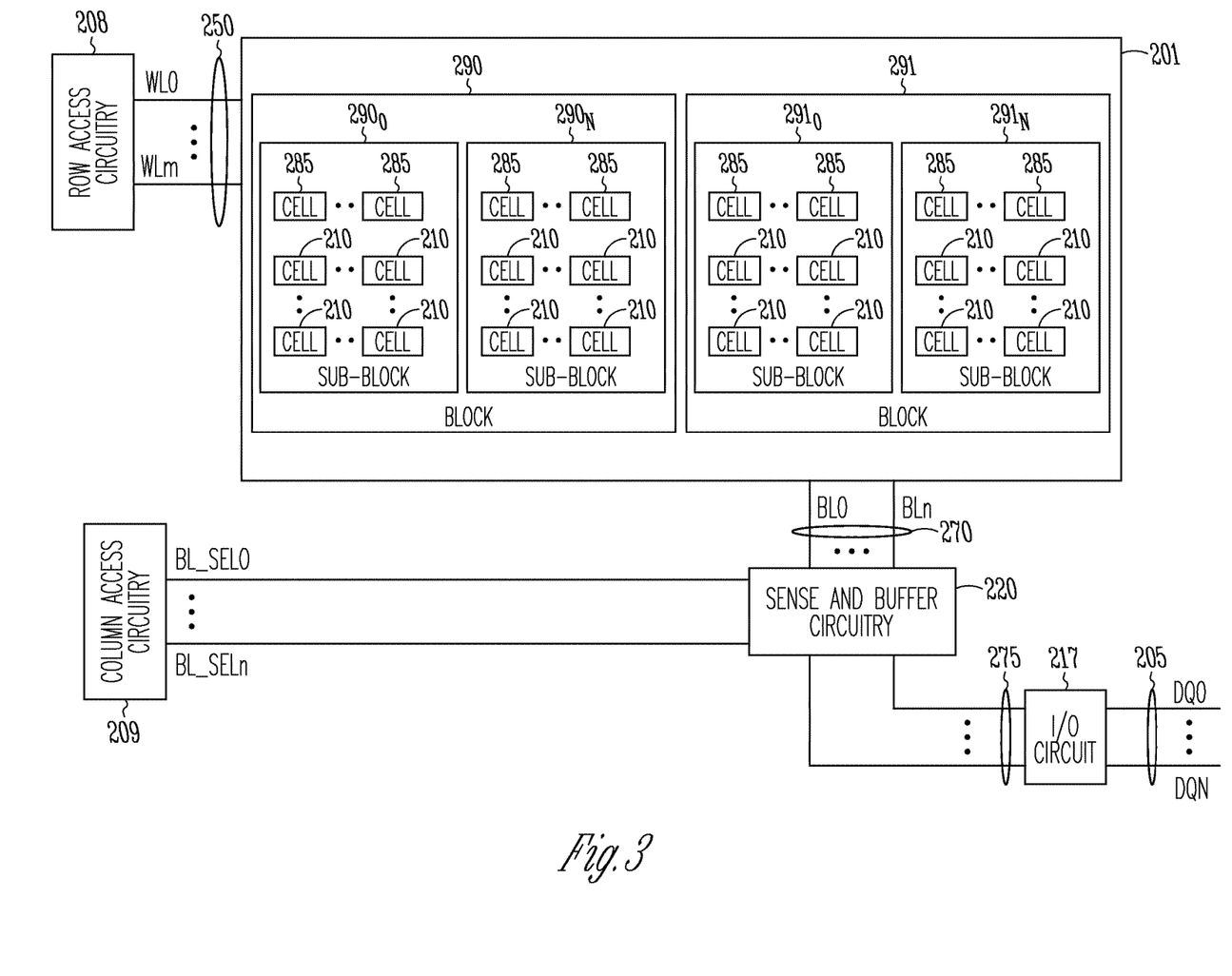
FIG. 3 is a block diagram of memory cells of memory components of a memory device according to some examples described herein.

FIG. 3 is a block diagram of memory cells of memory components 214, 216 of memory device 200 in FIG. 2. The memory cells can include non-volatile memory cells having mixed memory cell types integrated in the same integrated circuit (IC) chip, according to some examples described herein. The memory cells are included in a memory array (or multiple memory arrays) 201. The memory array 201 contains memory cells 210 and 285. Memory cells 210 and 285 can be arranged vertically (e.g., stacked over each other) over a substrate of a memory component (e.g., a semiconductor substrate of an IC chip that includes the memory component). Memory cells 210 and 285 can include non-volatile cells. Memory cells 210 and 285 can have different non-volatile memory cell types. For example, memory cells 210 can include floating gate memory cells, charge trap memory cells, or other types of non-volatile memory cells. Memory cells 285 can include ferroelectric memory cells, phase change memory cells, resistive memory cells, conduction bridge memory cells, and spin-transfer-torque magnetic random access memory (STT-MRAM) cells, or other types of non-volatile memory cells.

As shown in FIG. 3, memory cells 210 and 285 can be arranged in blocks (memory cell blocks), such as blocks 290 and 291. Each of blocks 290 and 291 can include sub-blocks. For example, block 290 can include sub-blocks $290_0$ and $290_n$, and block 291 can include sub-blocks $291_0$ and $291_n$.

Each of sub-blocks $290_0$, $290_n$, $291_0$, and $291_n$ can include a combination of memory cells 210 and 285. FIG. 3 shows memory cells arranged in two blocks 290 and 291 and two sub-blocks in each of the blocks as an example. Memory array 201 can have more than two blocks and more than two sub-blocks in each of the blocks.

The memory cells can be included in memory planes. Different portions of a memory die can be referred to as different planes or plane groups (e.g., a group of two or more planes can constitute a plane group) of a same die. In an illustrative example intended to be non-limiting a memory device may include four memory dies with each die having two planes for a total of eight planes. Commands to the different planes of the same die may execute simultaneously. The memory cells 210 and 285 can be arranged in, for example, a number of devices, semi-conductor dies, planes, sub-blocks, blocks, or pages. More than one plane, sub-block, block, or page can be included on one memory die.

As shown in FIG. 3, access lines can carry signals (e.g., word line signals) WL0 through WLm, and data lines 270 can carry signals (e.g., bit line signals) BL0 through BLn. Access lines 250 can be used to selectively access sub-blocks $290_0$, $290_n$, $291_0$, and $291_n$ of blocks 290 and 291 and data lines 270 can be used to selectively exchange information (e.g., data) with memory cells 210 of blocks 290 and 291.

Row access circuitry 208 and column access circuitry 209 can decode address information. Based on decoded address information, it can be determined which memory cells 210 of which sub-blocks of blocks 290 and 291 are to be accessed during a memory operation. A read operation can be performed to read (e.g., sense) information (e.g., previously stored information) in memory cells 210, or a write (e.g., program) operation can be performed to store (e.g., program) information in memory cells 210. Data lines 270 associated with signals BL0 through BLn provide information to be stored in memory cells 210 or obtain information read (e.g., sensed) from memory cells 210. An erase operation can be performed to erase information from some or all of memory cells 210 of blocks 290 and 291.

The memory control unit 218 in FIG. 2 is configured to control memory operations based on control signals. Examples of the control signals include one or more clock signals and other signals (e.g., a chip enable signal CE #, a write enable signal WE #) to indicate which operation (e.g., read, write, erase operation, erase-verify operation) to perform on the memory array 201.

Sense and buffer circuitry 220 are connected to the memory array 201 that can include sub-components such as sense amplifiers and page buffer circuits (e.g., data latches). Sense and buffer circuitry 220 can respond to signals BL_SEL0 through BL_SELn from column access circuitry 209. Sense and buffer circuitry 220 can be configured to determine (e.g., by sensing) the value of information read from memory cells 210 (e.g., during a read operation) of blocks 290 and 291 and provide the value of the information to lines (e.g., global data lines) 275. Sense and buffer circuitry 220 can also be configured to use signals on lines 275 to determine the value of information to be stored (e.g., programmed) in memory cells 210 of blocks 290 and 291 (e.g., during a write operation) based on the values (e.g., voltage values) of signals on lines 275 (e.g., during a write operation).

Input/output (I/O) circuitry 217 can be connected to the sense and buffer circuitry 220 to exchange information between memory cells 210 of blocks 290 and 291 and lines (e.g., I/O lines) 205. Signals DQ0 through DQN on lines 205 can represent information read from or stored in memory cells 210 of blocks 290 and 291. Lines 205 can include nodes within the memory components 214, 216 or pins (or solder balls) on a package where the memory components may reside.

Memory array 201 can receive a supply voltage, including supply voltages Vcc and Vss. Supply voltage Vss can operate at a ground potential (e.g., having a value of approximately zero volts). Supply voltage Vcc can include an external voltage supplied to memory array 201 from an external power source such as a battery or alternating current to direct current (AC-DC) converter circuitry.

Each of memory cells 210 can be programmed individually or collectively to one or a number of programmed states. For example, a single-level cell (SLC) can represent one of two programmed states (e.g., 1 or 0), representing one bit of data. However, flash memory cells can also be multi-level cells (MLCs) that represent one of more than two programmed states, allowing the manufacture of higher density memories without increasing the number of memory cells, as each cell can represent more than one binary digit (e.g., more than one bit).

In another example, each of memory cells 210 can be programmed to store information representing a value for multiple bits, such as one of four possible values "00", "01", "10", and "11" of two bits, one of eight possible values "000", "001", "010", "011", "100", "101", "110", and "111" of three bits, or one of other values of another number of multiple bits. A cell that has the ability to store multiple bits is sometimes called a multi-level cell (or multi-state cell). MLC is used herein in its broader context, to refer to any memory cell that can store more than one bit of data per cell (i.e., that can represent more than two programmed states, including a triple-level cell (TLC) can refer to a memory cell that can store three bits of data per cell (e.g., one of eight programmed states), and a quad-level cell (QLC) can store four bits of data per cell). The memory control unit 218 may manage the process of when to program SLC or MLC memory operations.

Memory array 201 can include non-volatile memory, such that memory cells 210 and 285 can retain information stored thereon when power (e.g., voltage Vcc, Vss, or both) is disconnected from the memory component. For example, memory array 201 can include flash memory, such as a NAND flash (e.g., 3-dimensional (3-D) NAND) One of ordinary skill in the art may recognize that memory component may include other sub-components not shown in FIG. 3 so as not to obscure the example embodiments described herein.

When designing a computer system, it can be useful to the designer to know the expected performance of the system at the managed memory level. This allows a certain throughput at the system level when writing a large amount of data to the memory.

Figure 4:
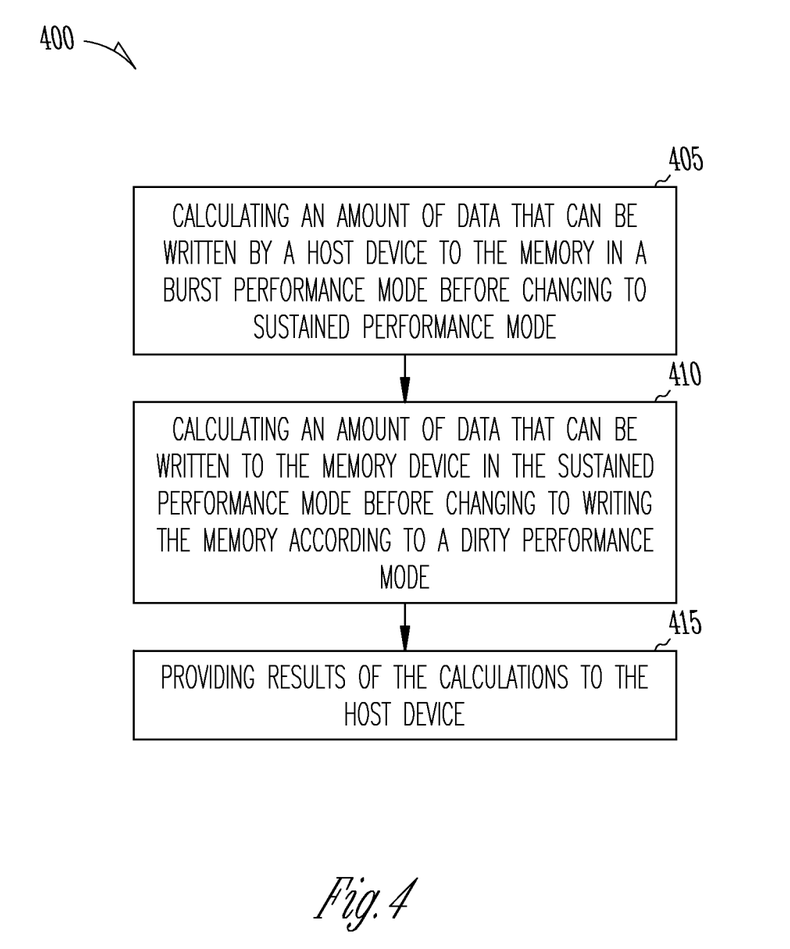
FIG. 4 is a flow diagram of an example of operating a memory device according to some examples described herein.

FIG. 4 is a flow diagram of an example of operating a memory device to optimize system throughput. The memory control unit of the memory device (e.g., memory control unit 218 of memory device 200 in FIG. 2) may be configured with instructions written in firmware that provide different levels of write performance. For example, the memory control unit may operate under a memory management protocol to implement a burst performance mode and another protocol to implement a sustained performance mode. The memory device writes data faster in the burst performance mode than in the sustained performance mode. In some examples, the memory device includes memory cells that are single level memory cells (SLCs) and memory cells that are multilevel memory cells (MLCs, e.g., three level memory cells or TLCs). In the burst performance mode, the memory control unit writes data to the SLCs. In the sustained performance mode, the memory control unit writes data to the MLCs. It can be useful to know when system performance will change due to changes in available memory space.

At block 405, the memory control unit calculates the amount of data that can be written by the host device (e.g., host device 105 in FIG. 1) to the memory in the burst performance mode before the write mode changes to the sustained performance mode due to lack of burst performance memory space (e.g., the SLCs are full of write data). In some examples, the memory control unit dynamically tracks the amount of SLC data written and compares the tracked amount to the total amount of SLCs available.

At block 410, the memory control unit also calculates the amount of data that can be written by the host device in the sustained performance mode before change modes due to lack of memory space (e.g., the MLCs are full of write data). In some examples, the memory control unit dynamically tracks the amount of MLC data written and compares the tracked amount to the total amount of MLCs available. When the memory control unit determines the amount of memory space is becoming so low that the sustained performance mode will be impacted, the memory control unit may change to writing data according to a dirty performance mode. In the dirty performance mode, the memory control unit may initiate a foreground garbage collection operation in which MLC memory space is freed up. Running the garbage collection in the foreground reduces the throughput of write operations to the memory system.

Figure 5:
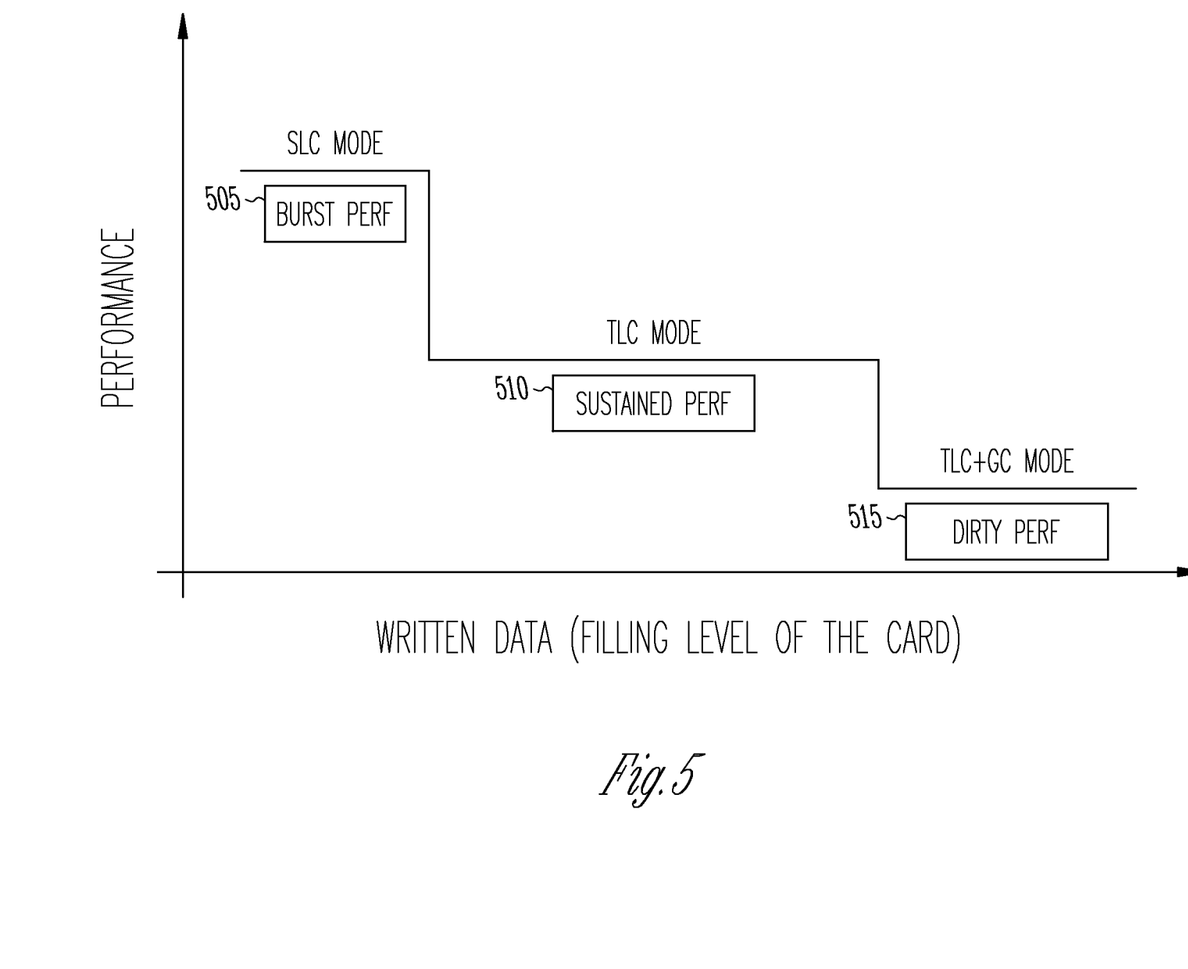
FIG. 5 is a graph showing three performance modes of memory operation according to some examples described herein.

FIG. 5 is a graph showing three performance modes of memory operation as a function of memory fill level. In some examples, the memory device is included in an embedded multimedia card (eMMC) and the horizontal axis is the fill level of the card. The performance mode may change while writing a large file to the memory. The memory write mode starts out in burst performance mode 505 when the memory is less full and SLCs are available. As the SLCs become unavailable at fill level A, the memory control unit changes to sustained performance mode 510. If the host device continues writing data to the point where the memory fills to fill level B, the memory control unit changes to the dirty performance mode at 515 to free memory space. The graph in the example of FIG. 5 shows that the performance of the memory decreases as the memory fills and changes modes. If the host device has notice of the approaching changes in performance, the host device can take action to avoid the decrease in performance.

Returning to FIG. 4 at block 415, the memory control unit provides the calculated amounts of available data to the host device. In some examples, the memory control unit writes the calculated value of the amount of data that can be written to the memory in the burst performance mode in a field of a register readable by the host device. If the amount of data is exceeded, the memory changes to the sustained performance mode. The memory control unit may also write the amount of data that can be written in the sustained performance mode in another field of the same register readable by the host device, or a different register readable by the host device. The memory control unit may dynamically perform the calculations and update the register fields recurrently after a write operation by the host device.

In some examples, the host device sends a command to the memory device and the memory controller performs the calculations in response to the command. The memory device may return the calculated amounts of data in a response message to the host device, or the host device may read the calculated amounts from the registers after the host device performs the calculations in response to the command.

The host device may check the amount of data available before writing a large data file to the memory device. In certain examples, the host device checks the amount of data available when writing a file that exceeds a predetermined threshold amount of data. If the host device wants to write the file in the burst performance mode and amount of data is greater than the calculated amount of burst performance space available, the host device may initiate removal of data from at least a portion of the memory to free up memory space (e.g., SLC memory space) before writing the file so that the write operation is performed in the burst performance mode. If the host device wants to avoid the memory device entering the dirty performance mode, the host device may free up additional memory space (e.g., one or both of SLC memory space and MLC memory space).

For instance, if the host device wants to perform a write operation and the amount of data in the write is greater than one or both of the amount of burst performance memory space available or the sustained performance memory space available, the host device may send a command to initiate a garbage collection operation in the memory device to free up memory space. In another example, the memory controller maps a logical memory space to a physical memory space. To free up memory space, the host device may send a command for the memory controller to unmap at least a portion of the physical memory space when the amount of data in the write operation is greater than the at least one of the calculated amounts of data space available.

The methods, devices, and systems described herein can improve performance of a computer system. Expected performance at a managed memory level can be determined by the host devices using information provided by the memory device. Monitoring the amount of space available in the memory device can ensure a certain level of throughput between host devices and a memory device.

Figure 6:
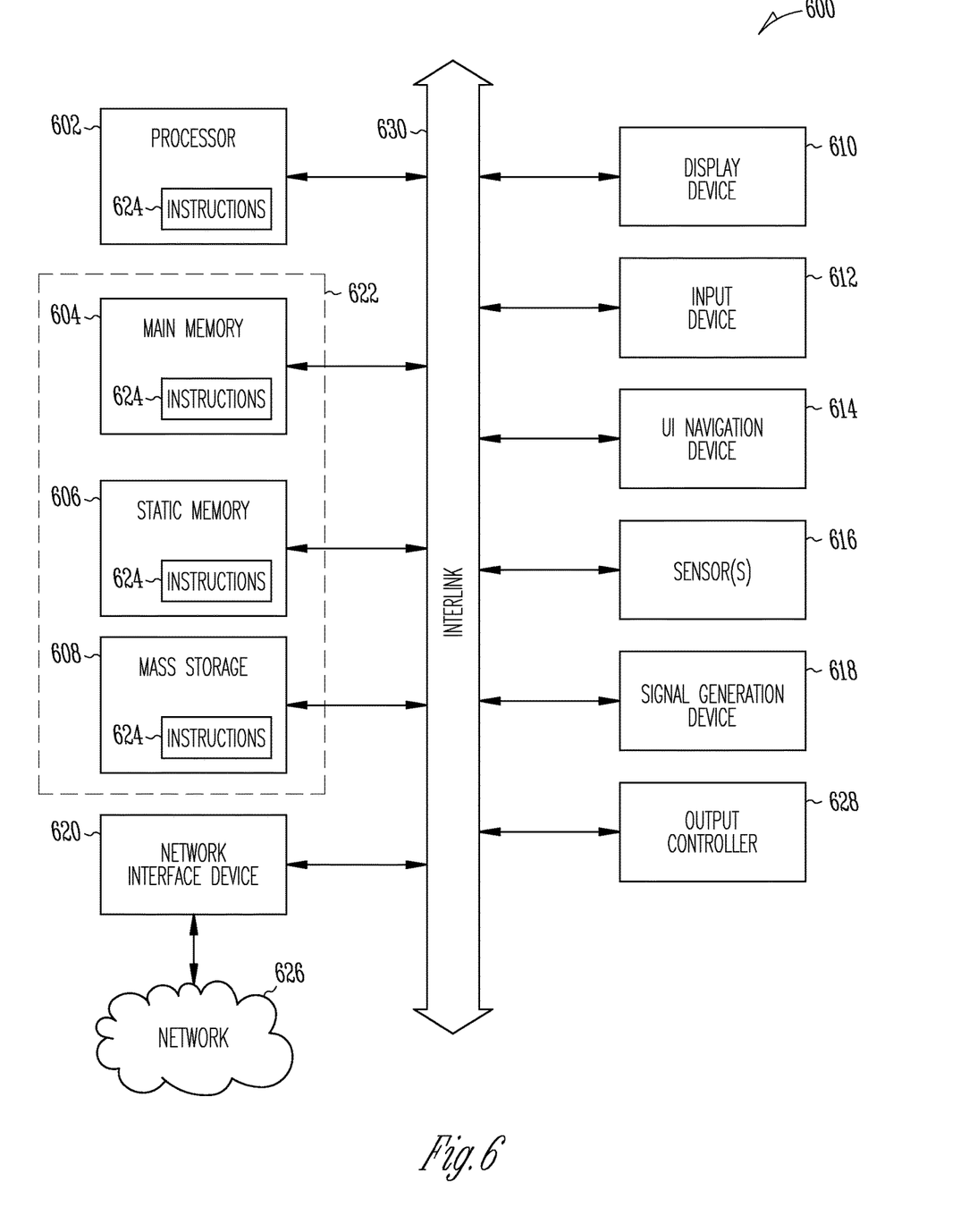
FIG. 6 illustrates a block diagram of an example machine according to some examples described herein.

FIG. 6 illustrates a block diagram of an example machine 600 upon which any one or more of the techniques (e.g., methodologies) discussed herein may perform, such as the described finer trim programming operations for extreme operating temperatures for example. In alternative examples, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The embodiments and examples, as described herein, may include, or may operate by, logic, components, devices, packages, or mechanisms. Circuitry is a collection (e.g., set)

of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 600 (e.g., the host 105, the memory device 110 of FIG. 1, etc.) may include a processing device 602 (e.g., a hardware processor, a central processing unit (CPU), a graphics processing unit (GPU), a hardware processor core, or any combination thereof, such as a memory control unit of the memory device 110, etc.), a main memory 604 (e.g., read-only memory (ROM), flash memory, dynamic random-access memory (DRAM) such as synchronous DRAM (SDRAM) or Rambus DRAM (RDRAM), etc.), a static memory 606 (e.g., flash memory, static random-access memory (SRAM), etc.), and a data storage system 618, some or all of which may communicate with each other via an interlink (e.g., bus) 630.

The processing device 602 can represent one or more general-purpose processing devices such as a microprocessor, a central processing unit, or the like. More particularly, the processing device 602 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 can be configured to execute instructions 626 for performing the operations and steps discussed herein. The machine 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 or within the processing device 602 during execution thereof by the machine 600, the main memory 604 and the processing device 602 also constituting machine-readable storage media. The machine-readable storage medium 624, the data storage system 618, or the main memory 604 can correspond to the memory device 110 of FIG. 1. In one implementation, the instructions 626 include instructions 611 contained in firmware to implement functionality corresponding to communicating a memory fault for the memory device (e.g., the operations of FIG. 9, FIG. 12, or FIG. 13).

While the machine-readable storage medium 624 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 600 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 600 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 626 (e.g., software, programs, an operating system (OS), etc.) or other data are stored on the data storage device 618 can be accessed by the main memory 604 for use by the processing device 602. The main memory 604 (e.g., DRAM) is typically fast, but volatile, and thus a different type of storage than the data storage device 618 (e.g., an SSD), which is suitable for long-term storage, including while in an "off" condition. The instructions 626 or data in use by a user or the machine 600 are typically loaded in the main memory 604 for use by the processing device 602. When the main memory 604 is full, virtual space from the data storage device 618 can be allocated to supplement the main memory 604; however, because the data storage device 618 device is typically slower than the main memory 604, and write speeds are typically at least twice as slow as read speeds, use of virtual memory can greatly reduce user experience due to storage device latency (in contrast to the main memory 604, e.g., DRAM). Further, use of the data storage device 618 for virtual memory can greatly reduce the usable lifespan of the data storage device 618.

In contrast to virtual memory, virtual memory compression (e.g., the Linux™ kernel feature "ZRAM") uses part of the memory as compressed block storage to avoid paging to the data storage device 618. Paging takes place in the compressed block until it is necessary to write such data to the data storage device 618. Virtual memory compression increases the usable size of the main memory 604, while reducing wear on the data storage device 618.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host (e.g., a host device), and are often removable and separate components from the host. In contrast, eMMC™ devices are attached to a circuit board and considered a component of the host, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host using a low-voltage differential signaling (LVDS) serial interface with dedicated read/write paths, further advancing greater read/write speeds.

The instructions 624 may further be transmitted or received over a network 620 using a transmission medium via the network interface device 608 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 608 may include one or more physical jacks (e.g., Ethernet, coaxial, or phone jacks) or one or more antennas to connect to the network 620. In an example, the network interface device 608 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, unless stated otherwise the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory control unit (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

Additional Description and Examples

Example 1 includes subject matter (such as a method of operating a memory device) comprising calculating, by the memory device, an amount of data that can be written by a host device to the memory in a burst performance mode before changing to sustained performance mode; calculating an amount of data that can be written to the memory device in the sustained performance mode before changing to writing the memory according to a dirty performance mode; and providing results of the calculations to the host device.

In Example 2, the subject matter of Example 1 optionally includes the memory device writing the amounts of data calculated in one or more memory registers readable by the host device.

In Example 3, the subject matter of one or both of Examples 1 and 2 optionally includes the memory device calculating the amounts of data in response to a write operation by the host device.

In Example 4, the subject matter of one or any combination of Examples 1-3 optionally includes the memory device calculating the amounts in response to a command sent by the host device to calculate the amounts of data.

In Example 5, the subject matter of Example 4 optionally includes the memory device returning the calculation results in a response message sent to the host device in response to the command.

In Example 6, the subject matter of one or both of Examples 4 and 5 optionally includes the host device sending the command to the memory device in response to a pending write operation to the memory device that exceeds a predetermined amount of data.

In Example 7, the subject matter of one or any combination of Examples 1-6 optionally includes the memory device writing the data to single-level memory cells in the burst mode, the memory device writing the data to multi-level memory cells in the sustained performance mode, and the memory device performing garbage collection in the dirty performance mode.

In Example 8, the subject matter of one or any combination of Examples 1-7 optionally includes comparing, by the host device, the calculated amount of data to an amount of data included in a write operation to be performed; and removing at least a portion of the data stored in the memory device when the amount of data in the write operation is greater than at least one of the calculated amounts of data.

In Example 9, the subject matter of Example 8 optionally includes sending, by the host device, a command to initiate a garbage collection operation in the memory device when the amount of data in the write operation is greater than the at least one of the calculated amounts of data.

In Example 10, the subject matter of one or both of Examples 8 and 9 optionally includes mapping a logical memory space to a physical memory space using the memory device; and sending, by the host device, a command to unmap at least a portion of the physical memory space when the amount of data in the write operation is greater than the at least one of the calculated amounts of data.

In Example 11, the subject matter of one or any combination of Examples 1-10 optionally includes calculating the amounts of data using a memory control unit of an embedded multimedia card (eMMC).

Example 12 includes subject matter (such as a memory device) or can optionally be combined with one or any combination of Examples 1-11 to include such subject matter, comprising a memory array including memory cells, and a memory control unit operatively coupled to the memory array. The memory control unit is configured to calculate an amount of data that can be written by a host device to the memory device in a burst performance mode before changing to sustained performance mode; calculate an amount of data that can be written to the memory device in the sustained performance mode before changing to writing the memory according to a dirty performance mode; and provide results of the calculations to the host device.

In Example 13, the subject matter of Example 12 optionally includes a memory array includes single level memory cells and multilevel memory cells; and a memory control unit configured to write the data to single-level memory cells in the burst mode, write the data to multi-level memory cells in the sustained performance mode, and initiate at least one garbage collection operation in the dirty performance mode.

In Example 14, the subject matter of Example 13 optionally includes the memory device being included in an embedded multi-media card (eMMC).

In Example 15, the subject matter of one or nay combination of Examples 12-14 optionally includes at least one register readable by the host device; and a memory control unit configured to write the amounts of data calculated in register fields of the at least one register.

In Example 16, the subject matter of one or any combination of Examples 12-15 optionally includes a memory control unit configured to calculate the amounts of data in response to a write operation by the host device.

In Example 17, the subject matter of one or any combination of Examples 12-16 optionally includes a memory control unit configured to calculate the amounts of data in response to a first command to perform the calculations sent by the host device.

In Example 18, the subject matter of Example 17 optionally includes a memory control unit configured to return the calculations to the host device in a response message sent in response to the first command.

Example 19 includes subject matter (or can optionally be combined with one or any combination of Examples 1-18 to include such subject matter) such as a computer readable storage medium including instructions that, when performed by a memory control unit of a memory device, cause the memory device to perform acts comprising calculating, by the memory device, an amount of data that can be written by a host device to the memory in a burst performance mode before changing to sustained performance mode; calculating an amount of data that can be written to the memory device in the sustained performance mode before changing to writing the memory according to a dirty performance mode; and storing the amount of data calculated in one or more memory registers readable by the host device.

In Example 20, the subject matter of Example 19 optionally includes the computer readable storage medium further including instructions to cause the memory device to calculate the amounts of data in response to a write operation by the host device.

These non-limiting Examples can be combined in any permutation or combination. The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method of operating a memory device including a memory control unit, the method comprising:
   calculating, by the memory device, an amount of data that can be written by a host device to the memory device in a burst performance mode before changing to sustained performance mode;
   calculating an amount of data that can be written to the memory device in the sustained performance mode before changing to writing the memory device according to a dirty performance mode; and
   providing results of the calculations to the host device, wherein
   the memory device writing data to single-level memory cells in the burst performance mode, the memory device changing to writing the data to multi-level memory cells in the sustained performance mode in response to an amount of data exceeding the amount that can be written in the burst performance mode, and the memory device changing to performing garbage collection in the dirty performance mode in response to an amount of data exceeding the amount that can be written in the sustained mode.

2. The method of claim 1, including:
   comparing, by the host device, the calculated amounts of data to an amount of data included in a write operation to be performed; and
   removing at least a portion of the data stored in the memory device when the amount of data in the write operation is greater than at least one of the calculated amounts of data.

3. The method of claim 2, including sending, by the host device, a command to initiate a garbage collection operation in the memory device when the amount of data in the write operation is greater than at least one of the calculated amounts of data.

4. The method of claim 2, including:
   mapping a logical memory space to a physical memory space using the memory device; and
   sending, by the host device, a command to unmap at least a portion of the physical memory space when the amount of data in the write operation is greater than the at least one of the calculated amounts of data.

5. The method of claim 1, wherein the calculating by the memory device includes calculating the amounts of data using a memory control unit of an embedded multimedia card (eMMC).

6. The method of claim 1, wherein the providing results of the calculations to the host device includes the memory device writing the amounts of data calculated in one or more memory registers readable by the host device.

7. The method of claim 1, wherein calculating the amounts of data includes the memory device calculating the amounts of data in response to a write operation by the host device.

8. The method of claim 1, wherein calculating the amounts of data includes the memory device calculating the amounts in response to a command sent by the host device to calculate the amounts of data.

9. The method of claim 8, wherein the providing results of the calculations to the host device includes the memory device returning the calculation results in a response message sent to the host device in response to the command.

10. The method of claim 8, including the host device sending the command to the memory device in response to a pending write operation to the memory device that exceeds a predetermined amount of data.

11. A memory device comprising:
    a memory array including memory cells, wherein the memory array includes single level memory cells and multilevel memory cells;
    a memory control unit configured to:
       calculate an amount of data that can be written by a host device to the memory device in a burst performance mode before changing to sustained performance mode;
       calculate an amount of data that can be written to the memory device in the sustained performance mode before changing to writing the memory according to a dirty performance mode; and
       provide results of the calculations to the host device,
    wherein the memory control unit is further configured to write data to the single-level memory cells in the burst performance mode, write the data to the multi-level memory cells in the sustained performance mode in response to an amount of data exceeding the amount that can be written in the burst performance mode, and initiate at least one garbage collection operation in the dirty performance mode in response to an amount of data exceeding the amount that can be written in the sustained mode.

12. The memory device of claim 11, wherein the memory device is included in an embedded multi-media card (eMMC).

13. The memory device of claim 11, including:
    at least one register readable by the host device; and
    wherein the memory control unit is configured to write the amounts of data calculated in register fields of the at least one register.

14. The memory device of claim 11, wherein the memory control unit is configured to calculate the amounts of data in response to a write operation by the host device.

15. The memory device of claim 11, wherein the memory control unit is configured to calculate the amounts of data in response to a first command to perform the calculations sent by the host device.

16. The memory device of claim 15, wherein the memory control unit is configured to return the calculations to the host device in a response message sent in response to the first command.

17. A non-transitory computer readable storage medium including instruction that, when performed by a memory control unit of a memory device, cause the memory device to perform acts comprising:
- calculating, by the memory device, an amount of data that can be written by a host device to the memory device in a burst performance mode before changing to sustained performance mode;
- calculating an amount of data that can be written to the memory device in the sustained performance mode before changing to writing the memory device according to a dirty performance mode;
- storing the amounts of data calculated in one or more memory registers readable by the host device;
- writing data to single-level memory cells in the burst mode;
- changing to writing the data to multi-level memory cells in the sustained performance mode in response to an amount of data exceeding the amount that can be written in the burst performance mode; and
- changing to performing garbage collection in the dirty performance mode in response to an amount of data exceeding the amount that can be written in the sustained performance mode.

18. The non-transitory computer readable storage medium of claim 17, including instructions that cause the memory device to calculate the amounts of data in response to a write operation by the host device.

\* \* \* \* \*